United States Patent
Imai et al.

(10) Patent No.: US 10,274,391 B2
(45) Date of Patent: Apr. 30, 2019

(54) PRESSURE DETECTION DEVICE

(71) Applicant: Surpass Industry Co., Ltd., Gyoda-shi, Saitama (JP)

(72) Inventors: Hiroshi Imai, Saitama (JP); Masamichi Kobayashi, Saitama (JP); Kazuo Abo, Saitama (JP)

(73) Assignee: Surpass Industry Co., Ltd., Gyoda-shi, Saitama (JP)

( * ) Notice: Subject to any disclaimer, the term of this patent is extended or adjusted under 35 U.S.C. 154(b) by 52 days.

(21) Appl. No.: 15/427,097

(22) Filed: Feb. 8, 2017

(65) Prior Publication Data

US 2018/0120186 A1 May 3, 2018

(30) Foreign Application Priority Data

Oct. 27, 2016 (JP) .................................. 2016-210558

(51) Int. Cl.
*G01L 9/00* (2006.01)
*G01L 19/00* (2006.01)
(Continued)

(52) U.S. Cl.
CPC ............ *G01L 19/14* (2013.01); *G01L 9/0041* (2013.01); *G01L 19/069* (2013.01)

(58) Field of Classification Search
CPC ..... G01L 19/04; G01L 19/147; G01L 9/0042; G01L 9/0072; G01L 13/025; G01L 9/0054; G01L 9/0075; G01L 19/14; G01L 19/0069; G01L 19/0084; G01L 19/0645; G01L 9/0052; G01L 19/0038; G01L 19/0092; G01L 19/0618; G01L 9/0051; G01L 9/0055; G01L 9/0073; G01L 11/025; G01L 19/0046; G01L 19/06; G01L 19/0681;
(Continued)

(56) References Cited

U.S. PATENT DOCUMENTS 6,640,639 B2 11/2003 Okawa
2003/0037618 A1 2/2003 Okawa
(Continued)

FOREIGN PATENT DOCUMENTS

EP 3 156 705 A1 4/2017
JP 4846140 B2 12/2011
JP 5987100 B1 9/2016

OTHER PUBLICATIONS

Extended European Search Report dated Aug. 3, 2017 (English Translation).
(Continued)

*Primary Examiner* — Andre J Allen
(74) *Attorney, Agent, or Firm* — Muncy, Geissler, Olds & Lowe, P.C.

(57) ABSTRACT

Provided is a pressure detection device including: a pressure sensor including a pressure detection surface for detecting a pressure of a fluid; and a flow channel unit having a flow channel formed therein to guide the fluid to the pressure detection surface. The flow channel unit includes a flow channel body having the flow channel 21a formed therein, and an earth ring disposed in contact with the pressure sensor. The earth ring is formed of a conductive fluororesin material including a fluororesin material and a conductive material in which the fluororesin material is dispersed, and is maintained at a ground potential.

8 Claims, 7 Drawing Sheets

(51) Int. Cl.
*G01L 19/14* (2006.01)
*G01L 19/06* (2006.01)

(58) Field of Classification Search
CPC . G01L 19/143; G01L 7/00; G01L 9/00; G01L 9/0041; G01L 9/0044; G01L 19/0007; G01L 19/0023; G01L 19/0627; G01L 19/0672; G01L 19/069; G01L 19/142; G01L 19/16; G01L 27/002; G01L 7/08; G01L 7/163; G01L 7/166; G01L 9/0047; G01L 11/02; G01L 11/04; G01L 15/00; G01L 19/0609; G01L 19/083; G01L 19/148; G01L 1/18; G01L 1/26; G01L 9/0048; G01L 9/006; G01L 9/007; G01L 9/0076; G01L 9/06; G01L 9/065; G01L 9/12; G01L 9/125; G01L 11/00; G01L 13/00; G01L 17/00; G01L 19/00; G01L 19/0015; G01L 19/003; G01L 19/0076; G01L 19/02; G01L 19/08; G01L 19/10; G01L 19/141; G01L 19/145; G01L 1/142; G01L 1/2262; G01L 1/2287; G01L 1/246; G01L 21/12; G01L 23/16; G01L 27/005; G01L 27/007; G01L 7/04; G01L 7/063; G01L 7/082; G01L 7/084; G01L 7/16; G01L 9/0002; G01L 9/0007; G01L 9/0016; G01L 9/0019; G01L 9/0022; G01L 9/0027; G01L 9/0033; G01L 9/0039; G01L 9/0045; G01L 9/005; G01L 9/0058; G01L 9/0077; G01L 9/0079; G01L 9/008; G01L 9/0092; G01L 9/0095; G01L 9/025; G01L 9/04; G01L 9/045; G01L 9/08; G01L 9/085; G01L 9/105; G01L 9/14; G01L 9/16
USPC .................................................. 73/700–756
See application file for complete search history.

(56) References Cited

U.S. PATENT DOCUMENTS

| | | | |
|---|---|---|---|
| 2006/0075822 A1* | 4/2006 | Aizawa | G01L 9/0042 73/715 |
| 2013/0001525 A1 | 1/2013 | Hu et al. | |
| 2015/0260601 A1* | 9/2015 | Hasunuma | G01L 19/0092 73/714 |
| 2017/0108149 A1 | 4/2017 | Imai et al. | |
| 2017/0370792 A1* | 12/2017 | Hasunuma | G01L 19/0007 |

OTHER PUBLICATIONS

Extended European Search Report (EESR) dated Jul. 31, 2017 for Co-pending U.S. Appl. No. 15/427,366 (English Translation).

* cited by examiner

PRESSURE DETECTION DEVICE

CROSS-REFERENCE TO RELATED APPLICATIONS

This application is based on Japanese Patent Application No. 2016-210558, the contents of which are incorporated herein by reference in its entirety.

TECHNICAL FIELD

The present disclosure relates to a pressure detection device that detects a pressure of a fluid circulated through a flow channel.

BACKGROUND ART

A pressure sensor including a housing provided with a flow channel to which a liquid, such as a drug solution, is introduced, and a sensor element for detecting a pressure of liquid to be transmitted to a pressure-sensitive portion in contact with the liquid introduced to the flow channel has been conventionally known (for example, see the Publication of Japanese Patent No. 4846140 (hereinafter referred to as "JP 4846140")).

In the pressure sensor disclosed in JP 4846140, since the housing and the pressure-sensitive portion are formed of a material including, as a main component, a fluorine-contained resin having an excellent chemical resistance, static electricity is likely to be accumulated on the housing and the pressure-sensitive portion due to a friction with the liquid. Accordingly, the pressure sensor disclosed in JP 4846140 has a structure in which aluminum foil is attached to the surface of the sensor element that is in contact with the pressure-sensitive portion, thereby allowing the static electricity accumulated on the pressure-sensitive portion to be discharged to a shield line.

SUMMARY

Technical Problem

However, the inventors have obtained findings that even when the structure for bringing the pressure-sensitive portion into contact with aluminum foil, such as the pressure sensor disclosed in JP 4846140, is employed, a phenomenon in which static electricity accumulated on the housing is discharged to the aluminum foil and the sensor element may occur. When the static electricity accumulated on the housing is discharged to the aluminum foil and the sensor element, defects such as a defect that the sensor element is damaged and a defect that a part of the pressure-sensitive portion is damaged and the liquid contacts the sensor element occur.

The present disclosure has been made in view of the above-mentioned circumstances, and an object of the present disclosure is to provide a pressure detection device capable of preventing the occurrence of a defect that static electricity is accumulated on the pressure detection portion for detecting a pressure of a fluid and on the flow channel body having the flow channel formed therein.

Solution to Problem

To solve the above-mentioned problem, the present disclosure employs the following solutions.

A pressure detection device according to one aspect of the present disclosure includes: a pressure detection portion including a pressure detection surface for detecting a pressure of a fluid; and a flow channel portion having a flow channel formed therein, the flow channel being configured to guide the fluid to the pressure detection surface. The flow channel portion includes a flow channel body having the flow channel formed therein, and a contact portion disposed in contact with the pressure detection portion. The contact portion is formed of a conductive fluororesin material including a fluororesin material and a conductive material in which the fluororesin material is dispersed, and is maintained at a ground potential.

According to the pressure detection device according to one aspect of the present disclosure, since the contact portion is formed of the conductive fluororesin material and is maintained at the ground potential, static electricity generated on the contact portion due to a friction with the fluid can be removed. Further, since the contact portion maintained at the ground potential is disposed in contact with the pressure detection portion, static electricity generated on the pressure detection portion due to a friction with the fluid is also removed.

Thus, the pressure detection device according to one aspect of the present disclosure can prevent the occurrence of a defect that static electricity is accumulated on the pressure detection portion for detecting the pressure of the fluid and on the flow channel portion having the flow channel formed therein.

The pressure detection device according to one aspect of the present disclosure may further include an annular seal member formed of an elastic material. In the pressure detection device, the flow channel may be a flow channel extending along an axis line; the contact portion may include a recessed groove portion formed into an annular shape about the axis line in a region opposed to the pressure detection surface; and the seal member may be accommodated in the recessed groove portion in a state where the seal member is in contact with the pressure detection portion.

With this structure, a portion where a portion of the contact portion that is located at the inner peripheral side of the recessed groove portion is in contact with the pressure detection portion corresponds to a first seal region having an endless shape, and a portion where the seal member accommodated in the recessed groove portion is in contact with the pressure detection portion corresponds to a second seal region having an endless shape. These two seal regions can reliably prevent leakage of the fluid.

The pressure detection device according to one aspect of the present disclosure may have a structure in which: the flow channel is a flow channel extending along an axis line; the contact portion is formed into an annular shape about the axis line; the flow channel body includes an accommodating portion configured to accommodate the contact portion; the pressure detection device further includes a first fixing portion configured to fix a position of the contact portion in the axis line direction by pressing the contact portion against the accommodating portion; and the first fixing portion is formed of a metallic material and is maintained at a ground potential.

With this structure, the position of the contact portion in the axis line direction can be reliably fixed by the first fixing portion and the contact portion can be maintained at the ground potential via the first fixing portion.

The pressure detection device having a structure as described above may further include a second fixing portion configured to fix a position of the pressure detection portion in the axis line direction by pressing the pressure detection portion against the contact portion.

With this structure, the position of the pressure detection portion in the axis line direction can be more reliably fixed by the second fixing portion.

In the pressure detection device having a structure as described above, the flow channel body may include a recess having an inner peripheral surface formed into a tubular shape about the axis line; the first fixing portion may be formed into a tubular shape about the axis line; the second fixing portion may be formed into a tubular shape about the axis line; a female screw formed in an inner peripheral surface of the recess may be engaged with a male screw formed on an outer peripheral surface of the first fixing portion; and a female screw formed in an inner peripheral surface of the first fixing portion may be engaged with a male screw formed on an outer peripheral surface of the second fixing portion.

With this structure, the positions of the contact portion and the pressure detection portion in the axis line direction can be fixed by such a simple operation that the outer peripheral surface of the first fixing portion is engaged with the inner peripheral surface of the recess of the flow channel body and then the outer peripheral surface of the second fixing portion is engaged with the inner peripheral surface of the first fixing portion.

The pressure detection device according to one aspect of the present disclosure may have a structure in which: the pressure detection portion is disposed in contact with the pressure detection surface and includes a thin film-like protective portion configured to break contact between the pressure detection surface and the fluid; and the protective portion is formed of the conductive fluororesin material.

With this structure, static electricity generated on the protective portion due to a friction with the fluid is introduced to the contact portion, which is maintained at the ground potential, via the protective portion and is removed.

In the pressure detection device having a structure as described above, the pressure detection surface may include: a thin film-like diaphragm having a first surface in contact with the protective portion; and a resistor attached to a second surface of the diaphragm, the second surface being not in contact with the protective portion, and the diaphragm may be formed of a non-conductive material.

With this structure, the pressure detection portion can appropriately isolate the resistor from the outside and highly accurately detect the pressure. When the diaphragm in contact with the protective portion is made of a non-conductive material, the static electricity is not transmitted to the diaphragm from the protective portion. However, since the protective portion is in contact with the contact portion, the static electricity can be introduced to the contact portion.

In the pressure detection device according to one aspect of the present disclosure, the conductive material may be carbon nanotubes, and the conductive fluororesin material may contain the carbon nanotubes at a ratio of 0.020 weight % to 0.030 weight %.

Even with such a small ratio of carbon nanotubes, 0.020 weight % or more of the carbon nanotubes are dispersed in the fluororesin material to apply a constant conductivity to the contact portion, thereby making it possible to prevent charging of static electricity. This is because when tube-like carbon nanotubes having a predetermined length are used as a conductive material, only a small number of carbon nanotubes are needed to apply a conductivity, unlike other granular conductive material such as carbon black and iron powder.

Further, since the ratio of the carbon nanotubes contained in the conductive fluororesin material is a small ratio of 0.030 weight % or less, the contamination of the fluid due to the contact between the contact portion and the fluid can be prevented, unlike other granular conductive materials such as carbon black and iron powder.

Advantageous Effects

According to the present disclosure, it is possible to provide a pressure detection device capable of preventing the occurrence of a defect that static electricity is accumulated on a pressure detection portion for detecting a pressure of a fluid and on a flow channel body having a flow channel formed therein.

DESCRIPTION OF EMBODIMENTS

A pressure detection device 100 according to one embodiment of the present disclosure will be described below with reference to the drawings.

Figure 1:
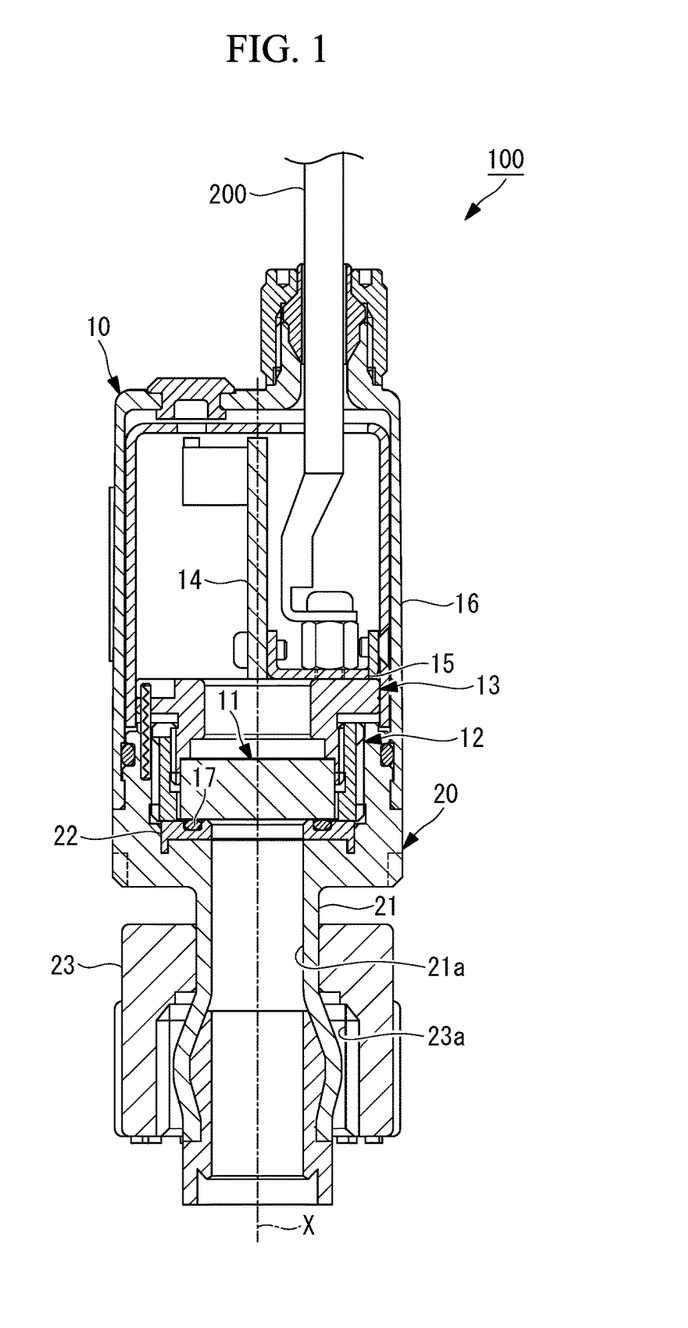
FIG. 1 is a longitudinal sectional view showing a pressure detection device of one embodiment.
Figure 2:
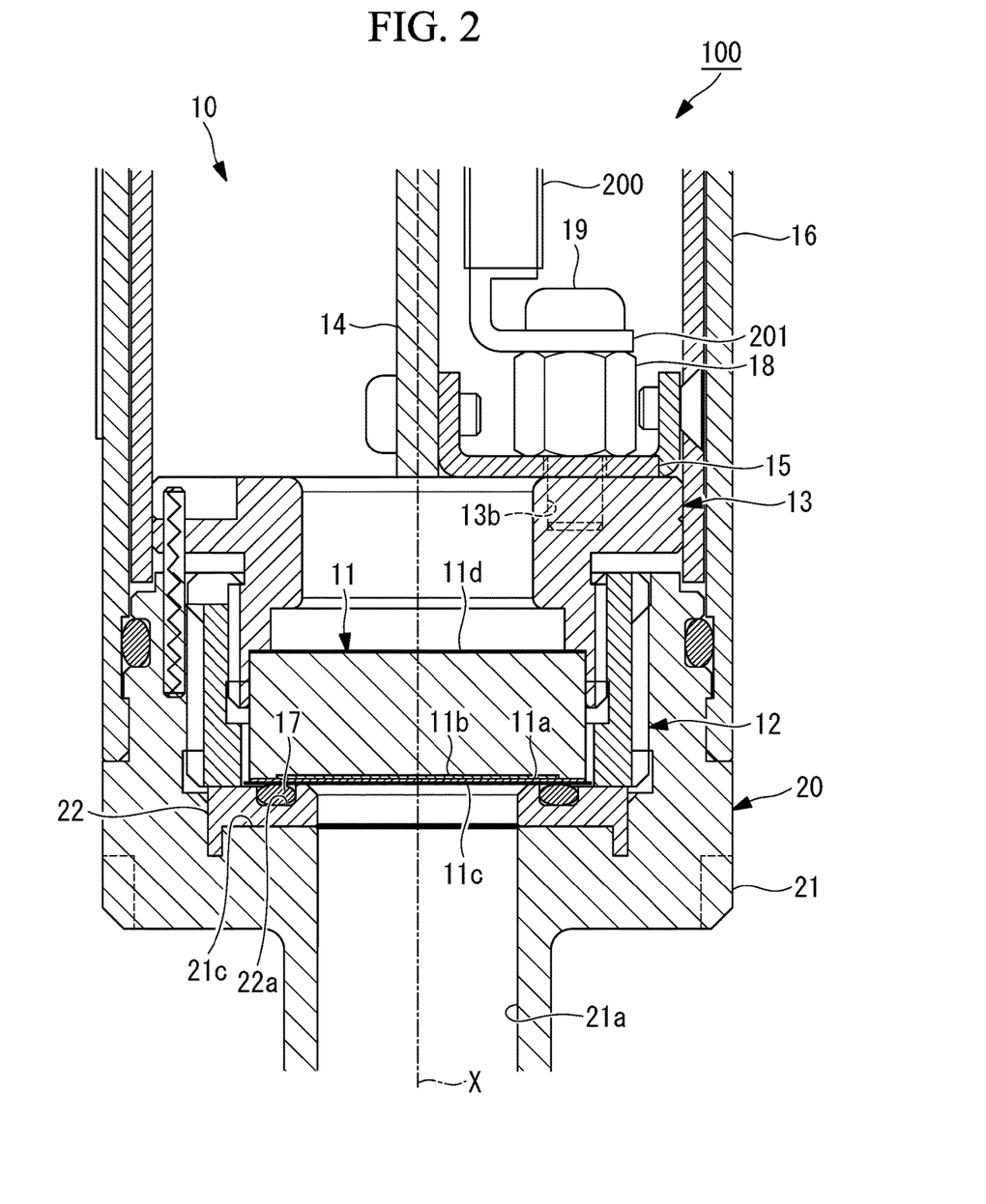
FIG. 2 is a partial enlarged view of a pressure detection unit shown in FIG. 1.

As shown in FIG. 1 and FIG. 2 (which is a partial enlarged view of a pressure detection unit 10 shown in FIG. 1), the pressure detection device 100 of this embodiment includes: the pressure detection unit 10 for detecting a pressure of a fluid; and a flow channel unit 20 including a flow channel body 21 having a flow channel 21a formed therein. The flow channel 21a is connected to a flow channel (not shown) which is branched from a pipe (not shown) through which the fluid is circulated.

The fluid used in this embodiment includes a liquid such as a drug solution, solvent, or pure water which is used in a semiconductor manufacturing process by a semiconductor manufacturing device. In the semiconductor manufacturing process, a fluid with high cleanliness is used. For example, ultrapure water having a volume resistivity of 15 MΩ·cm or more is used. When a liquid having a high volume resistivity is circulated, static electricity tends to be accumulated on the flow channel.

The fluid used in this embodiment also contains a gas such as an air or nitrogen gas. This is because an air or nitrogen gas is used for cleaning of flow channels and discharge of a liquid in the semiconductor manufacturing process. Note that when a liquid is discharged, the liquid being discharged and the gas for discharging the liquid are mixed. When the mixture of the liquid and the gas is circulated in the flow channel body 21 which is formed of a fluororesin material, static electricity is highly likely to be generated in the flow channel body 21 due to a friction between the mixture and the flow channel body 21.

Next, the flow channel unit 20 included in the pressure detection device 100 of this embodiment will be described.

The flow channel unit 20 includes a flow channel body (body portion) 21, an earth ring (contact portion) 22, and a nut 23.

Figure 3:
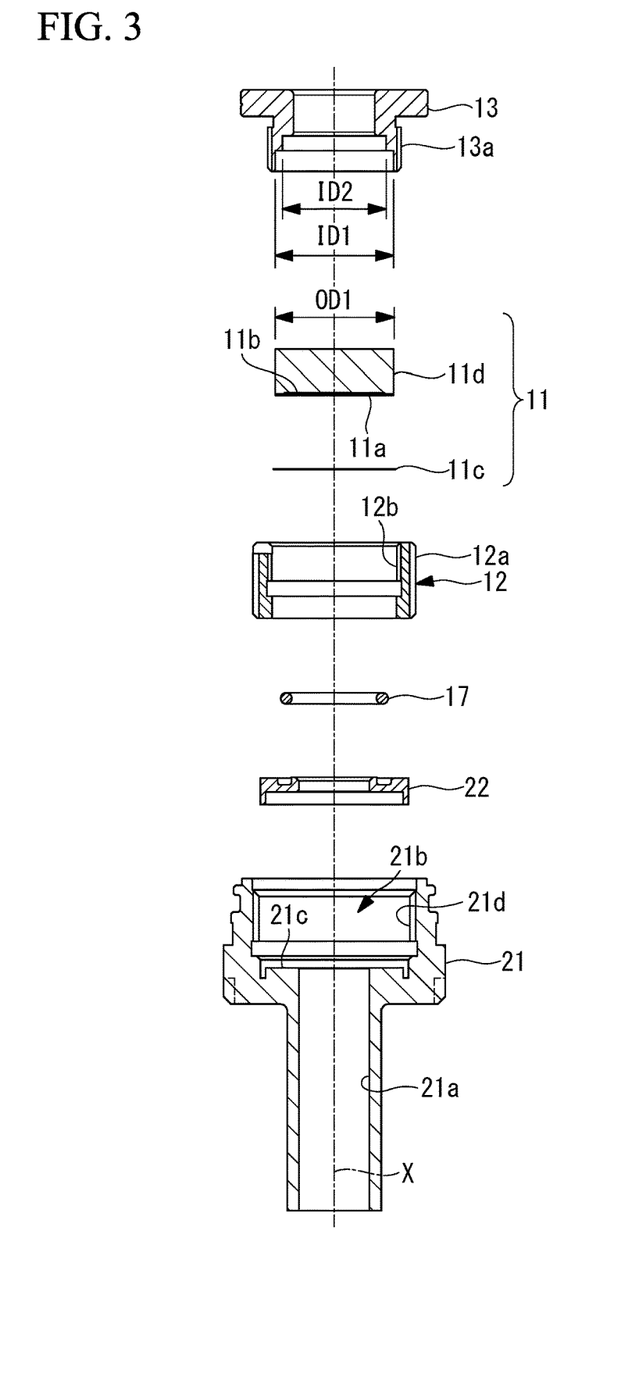
FIG. 3 is an exploded view of the pressure detection unit shown in FIG. 1.

As shown in the exploded view of FIG. 3, the flow channel body 21 is provided with a recess 21b, and a female screw 21d is formed in the inner peripheral surface of the recess 21b. Further, as shown in FIG. 2, a bottom surface (accommodating portion) 21c of the recess 21b services as an accommodating portion which accommodates the earth ring 22.

The flow channel 21a which extends linearly along an axis line X is formed in the flow channel body 21. The flow channel body 21 is formed of a fluororesin material such as PTFE (polytetrafluoroethylene), PCTFE (polychlorotrifluoroethylene), or PFA (tetrafluoroethylene-perfluoroalkyl vinyl ether copolymer). The flow channel body 21, which is formed of a fluororesin material that is an electrical insulating material, has a characteristic of accumulating static electricity in the flow channel body when static electricity is generated due to a friction with a fluid.

As shown in FIGS. 1 and 2, the earth ring 22 is a member which is disposed in contact with a pressure sensor 11 to be described later, and is formed of a conductive fluororesin material to be described later. The earth ring 22 is disposed in a region which is opposed to a pressure detection surface of the pressure sensor 11 that is composed of a diaphragm 11a and a strain gauge 11b. The earth ring 22 is a member formed into an annular shape about the axis line X, and includes a recessed groove portion 22a which is formed into an annular shape about the axis line in the region opposed to the pressure detection surface. In the recessed groove portion 22a, an annular O-ring (seal member) 17 which is formed of an elastic material, such as rubber, is disposed. The O-ring 17 is accommodated in the recessed groove portion 22a in a state where the O-ring 17 is in contact with the pressure sensor 11.

As described later, the earth ring 22 is formed of a conductive fluororesin material and is maintained at a ground potential. Accordingly, even when static electricity is generated on the earth ring 22, the static electricity is not accumulated on the earth ring 22 but instead is removed. Static electricity generated in a region close to the earth ring 22 of the flow channel body 21 is also removed by the earth ring 22.

The nut 23 is a member for connecting the flow channel body 21 to the flow channel (not shown) which is branched from the pipe (not shown) through which the fluid is circulated. A female screw 23a which is formed in the inner peripheral surface of the nut 23 is fastened to a male screw (not shown) which is formed on the outer peripheral surface of the branched flow channel, thereby connecting the flow channel 21a of the flow channel body 21 to the branched flow channel.

Next, the pressure detection unit 10 included in the pressure detection device 100 of this embodiment will be described.

The pressure detection unit 10 is a device which detects a pressure of a fluid to be transmitted to the diaphragm 11a.

As shown in FIGS. 1 and 2, the pressure detection unit 10 includes: the pressure sensor (pressure detection portion) 11 which detects a pressure of a fluid; an outer holder (first fixing portion) 12; a sensor holder (second fixing portion) 13; a sensor substrate 14; a substrate holding member 15; a housing 16; and the O-ring 17.

The components included in the pressure detection unit 10 will be described below.

As shown in FIG. 2, the pressure sensor 11 includes: the diaphragm 11a which is formed into a thin film shape; the strain gauge 11b which is a resistor to be attached to the diaphragm 11a; a thin film-like protective film (protective portion) 11c which breaks contact between the diaphragm 11a and the fluid; and a base portion 11d which holds the diaphragm 11a.

The pressure sensor 11 is a strain gauge pressure sensor which outputs a pressure signal corresponding to the resistance value of the strain gauge 11b that varies depending on the pressure to be transmitted to the diaphragm 11a. The diaphragm 11a and the strain gauge 11b form the pressure detection surface for detecting the pressure of the fluid.

The diaphragm 11a has a lower surface (first surface) which is in contact with the protective film 11c and an upper surface (second surface) which is not in contact with the protective film 11c. The strain gauge 11b is attached to the upper surface of the diaphragm 11a.

The diaphragm 11a is formed of a non-conductive material (such as sapphire or ceramics) having a corrosion resistance and a chemical resistance.

Figure 4:
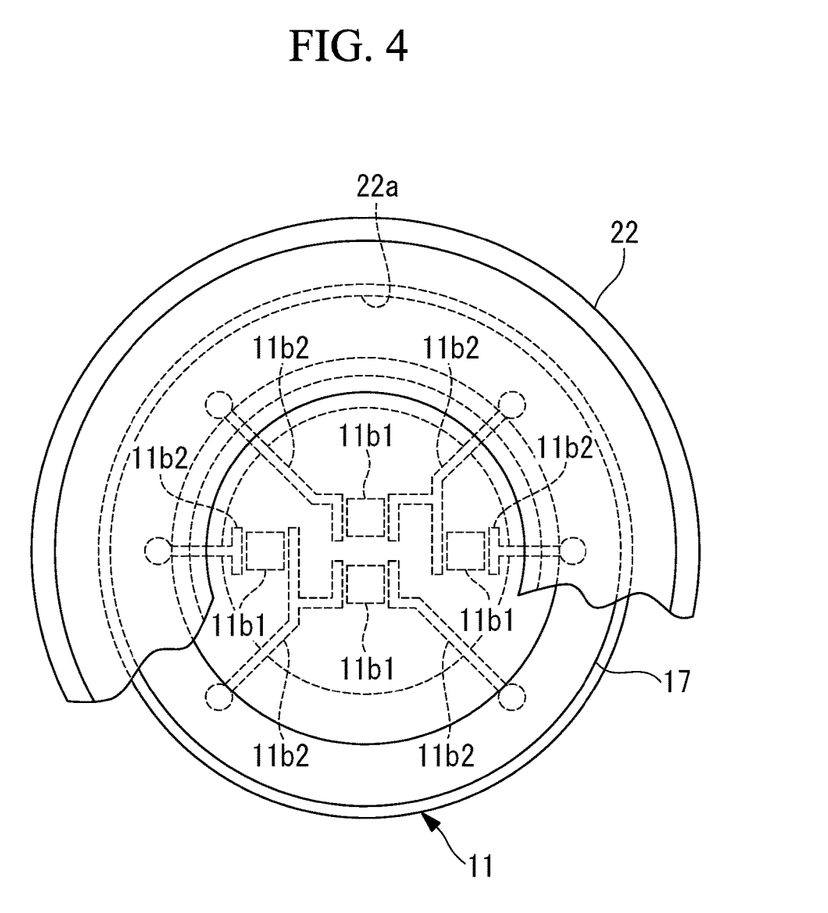
FIG. 4 is a bottom view of an earth ring and a pressure sensor shown in FIG. 2.

As shown in FIG. 4, the strain gauge 11b includes four resistors 11b1 and wires 11b2 for electrically connecting the four resistors 11b1.

FIG. 4 is a bottom view of the earth ring 22 and the pressure sensor 11 shown in FIG. 2. In FIG. 4, the illustration of members other than the earth ring 22 and the pressure sensor 11 is omitted. The illustration of a part of the earth ring 22 is also omitted.

As shown in FIG. 4, the wires 11b2 of the strain gauge 11b are each disposed at a position opposed to the region (region on the inside of the O-ring 17) where the earth ring 22 and the pressure sensor 11 are in contact with each other. While the protective film 11c and the diaphragm 11a are sandwiched between the earth ring 22 and the wires 11b2, the earth ring 22 and the wires 11b2 are close to each other with only a small distance therebetween. Accordingly, if static electricity is accumulated on the earth ring 22, a discharge phenomenon may occur between the earth ring 22 and the wires 11b2. In this embodiment, since the earth ring 22 is maintained at the ground potential, the static electricity is removed from the earth ring 22 to thereby prevent the discharge phenomenon from occurring.

The protective film 11c breaks contact between the diaphragm 11a and the fluid and is formed of a fluororesin material such as PTFE (polytetrafluoroethylene). The protective film 11c, which is formed of a fluororesin material that is an electrical insulating material, has a characteristic of accumulating static electricity in the protective film when static electricity is generated due to a friction with the fluid.

The outer holder 12 is a member which is made of metal (for example, made of stainless steel such as SUS 304) and is formed into a cylindrical shape about the axis line X. A male screw 12a is formed on the outer peripheral surface of the outer holder 12, and a female screw 12b is formed in the inner peripheral surface of the outer holder 12.

The outer holder 12 fixes the position of the earth ring 22 in the axis line X direction by fastening a male screw 12a, which is formed on the outer peripheral surface of the outer holder 12, to the female screw 21d, which is formed in the inner peripheral surface of the recess 21b, in a state where the earth ring 22 is accommodated in the bottom surface 21c of the recess 21b (see FIG. 3) which is formed in the flow channel body 21.

The outer holder 12 fixes the position of the earth ring 22 in the axis line X direction by pressing the earth ring 22 against the bottom surface 21c of the recess 21b. Thus, the earth ring 22 is in contact with both the outer holder 12 and the bottom surface 21c.

The sensor holder 13 is a member which is made of metal (for example, made of stainless steel such as SUS 304) and is formed into a cylindrical shape about the axis line X. The male screw 13a is formed on the outer peripheral surface of the sensor holder 13.

As shown in FIG. 3, the sensor holder 13 has a stepped shape in which an inner diameter ID1 at a lower end of the sensor holder 13 about the axis line X is larger than an outer diameter OD1 of the base portion 11d of the pressure sensor 11, and an inner diameter ID2 at an upper portion of the sensor holder 13 that is located at an upper side of the lower end of the sensor holder about the axis line X is smaller than the outer diameter OD1 of the base portion 11d of the pressure sensor 11. The sensor holder 13 fixes the position of the pressure sensor 11 in the axis line X direction by fastening the male screw 13a, which is formed on the outer peripheral surface of the sensor holder 13, to the female screw 12b which is formed in the inner peripheral surface of the outer holder 12.

The sensor holder 13 fixes the position of the pressure sensor 11 in the axis line X direction by pressing the pressure sensor 11 against the earth ring 22. Thus, a portion where a portion of the earth ring 22 that is located at the inner peripheral side of the recessed groove portion 22a is in contact with the protective film 11c of the pressure sensor 11 serves as a first seal region having an endless shape. The first seal region inhibits inflow of the fluid from the flow channel 21a to the pressure detection unit 10.

The sensor substrate 14 includes: an amplifier circuit (not shown) which amplifies the pressure signal output from the pressure sensor 11; an interface circuit which transmits the pressure signal amplified by the amplifier circuit to a pressure signal line (not shown) of the cable 200 (see FIGS. 1 and 2); and a power supply circuit (not shown) which transmits a power supply voltage, which is supplied from the outside via the cable 200, to the pressure sensor 11.

The substrate holding member 15 is a member which is made of metal (for example, made of stainless steel such as SUS 304) and holds the sensor substrate 14 with respect to the sensor holder 13. As shown in FIG. 2, the substrate holding member 15 is fastened to a fastening hole 13b, which is formed in the upper surface of the sensor holder 13, by a fastening screw 19 in a state where a spacer 18 is sandwiched therebetween.

The spacer 18 and the fastening screw 19 are each made of metal (for example, made of stainless steel such as SUS 304). Further, a crimp contact 201 which is made of metal and sandwiched between the spacer 18 and the fastening screw 19 is connected to an earth cable of the cable 200. Accordingly, the spacer 18, the fastening screw 19, the sensor holder 13, and the outer holder 12 which are electrically conductive with the crimp contact 201 are each maintained at the ground potential.

As described above, since the earth ring 22 is in contact with the outer holder 12, the earth ring 22 is maintained at the ground potential. In other words, the static electricity generated on the earth ring 22 is removed and transmitted to the earth cable.

The housing 16 is a member formed into a cylindrical shape about the axis line X. The inner peripheral surface of the housing 16 that is located at a lower end side thereof is attached to the outer peripheral surface of the flow channel body 21 that is located at an upper end side thereof. The housing 16 accommodates the sensor substrate 14 at the inner peripheral side thereof.

The O-ring 17 is an annular elastic member disposed in the recessed groove portion 22a of the earth ring 22. A second seal region having an endless shape about the axis line X is formed between the O-ring 17 and the protective film 11c. The second seal region disposed outside of the first seal region reliably inhibits inflow of the fluid from the flow channel 21a to the pressure detection unit 10.

Next, the conductive fluororesin material forming the earth ring 22 will be described.

The earth ring 22 of this embodiment is formed of a conductive fluororesin material including a fluororesin material and carbon nanotubes (conductive material) dispersed in the fluororesin material.

Examples of the fluororesin material used herein include PTFE, PCTFE, and PFA as mentioned above.

As the fluororesin material, powder-like material (for example, PTFE G163 manufactured by ASAHI GLASS CO., LTD.) can be used.

Carbon nanotubes having, for example, the following characteristics are desirably used.
 having a fiber length in a range from 50 μm to 150 μm.
 having a fiber diameter in a range from 5 nm to 20 nm.
 having a bulk density in a range from 10 mg/cm$^3$ to 70 mg/cm$^3$.
 having a G/D ratio in a range from 0.7 to 2.0.
 having purity of 99.5% or more.
 formed of multiple layers (for example, 4 to 12 layers).

In this case, the reason why the fiber length of carbon nanotubes is set to 50 μm or more is that when the carbon nanotubes are dispersed in the fluororesin material, only a small number of carbon nanotubes are needed to apply a sufficient conductivity.

The G/D ratio is a value indicating a ratio of G-band peaks and D-band peaks which appear in a Raman spectrum of the carbon nanotubes. The G-band is derived from a graphite structure, and the D-band is derived from a defect. The G/D ratio indicates a ratio of purity of crystal to a defect concentration in the carbon nanotubes.

Figure 5:
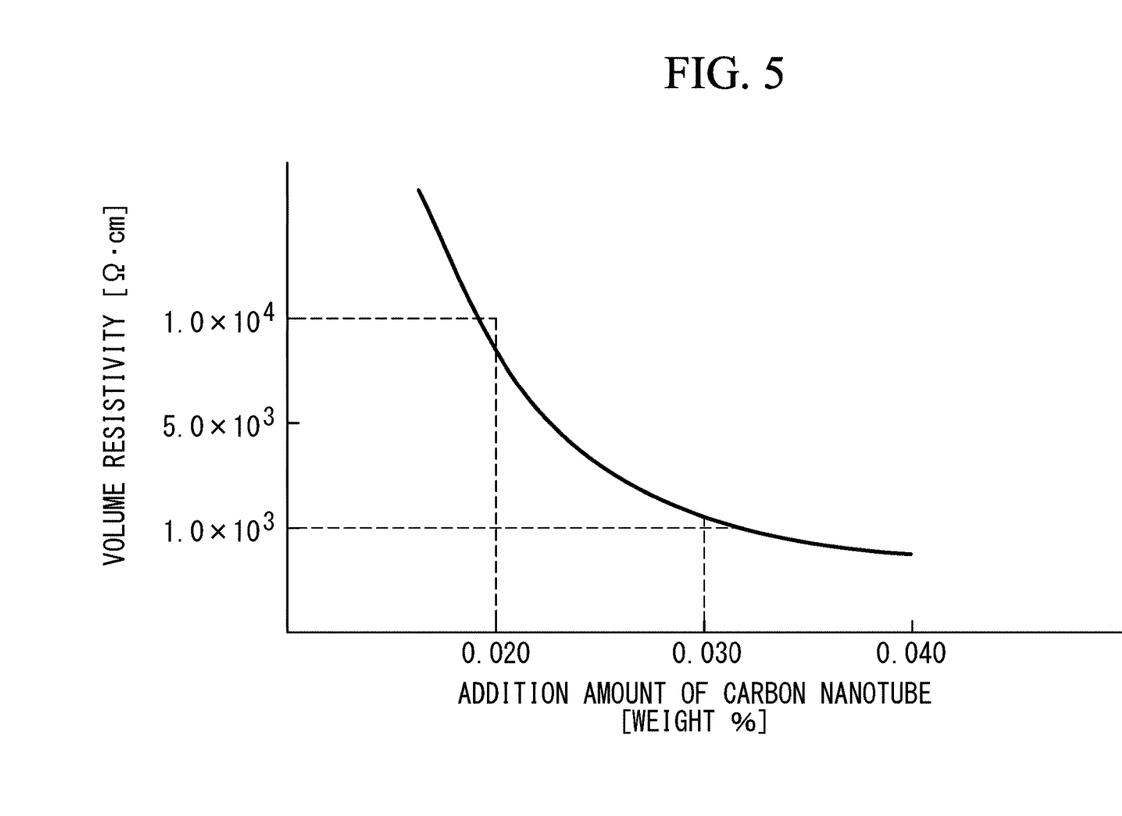
FIG. 5 is a graph showing a relationship between an additive amount of carbon nanotubes and a volume resistivity of a conductive fluororesin material.

The inventors have studied about the relationship between the additive amount (weight %) of carbon nanotubes dispersed in the fluororesin material and the volume resistivity (Ω·cm) of the conductive fluororesin material including the fluororesin material and the carbon nanotubes dispersed in the fluororesin material, and have obtained the results as shown in FIG. 5.

FIG. 5 shows the results of measurement of the volume resistivity of test pieces on the basis of "testing method for resistivity of conductive plastics with a four-point probe array" defined in JIS K 7194.

A plurality of test pieces was prepared by performing melt-kneading using a kneader and then performing compression molding using a compression molding machine to thereby process the test pieces into a size compliant with JIS K 7194.

PTFE G163 manufactured by ASAHI GLASS CO., LTD. was used as the fluororesin material for creating the test pieces.

For measurement of the volume resistivity, a resistivity meter using a 4-point probe method compliant with JIS K 7194 was used. The 4-point probe method is a method in which four needle-like probes (electrodes) are brought into contact with the test pieces and the resistance of each test piece is obtained based on a current caused to flow between two outside probes and a potential difference generated between two inside probes.

The volume resistivity was calculated by averaging the measurement values obtained at a plurality of positions from a plurality of test pieces.

According to the results shown in FIG. 5, the additive amount of carbon nanotubes was set in a range from 0.020 weight % to 0.030 weight %, so that the volume resistivity of the conductive fluororesin material was larger than $1.0 \times 10^3$ Ω·cm and less than $1.0 \times 10^4$ Ω·cm. This volume resistivity value is sufficiently smaller than the value ($10^{18}$ Ω·cm) of the volume resistivity of the fluororesin material in which carbon nanotubes are not dispersed.

Figure 6:
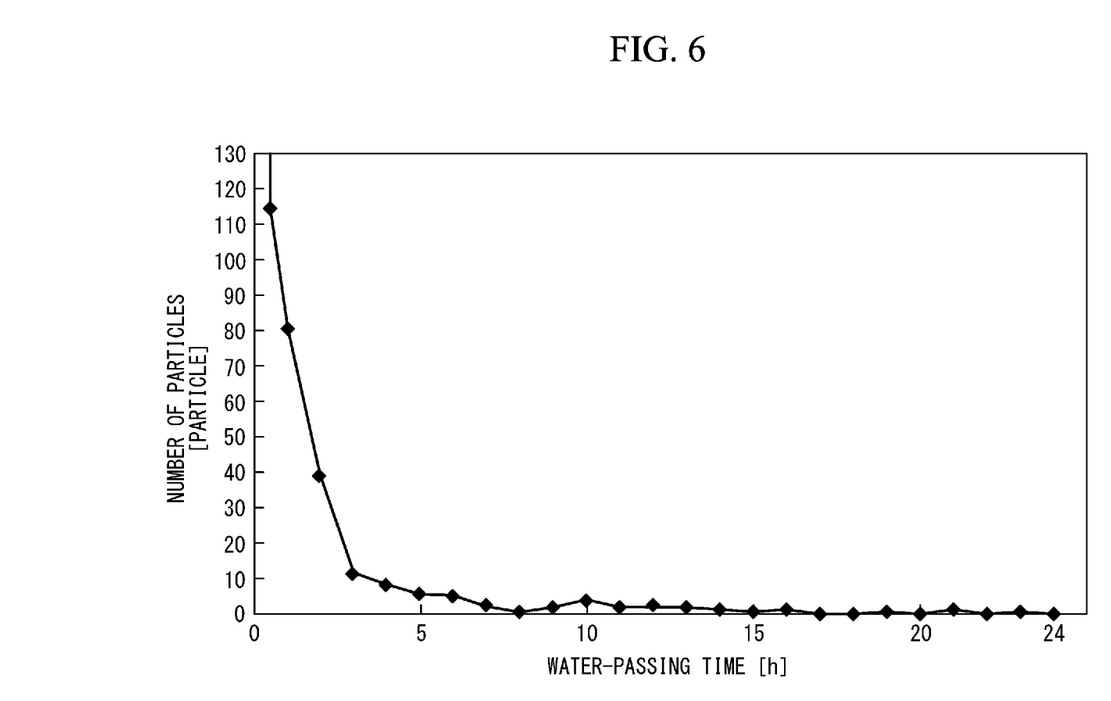
FIG. 6 is a graph showing a relationship between a time for flowing water and the number of particles.

The present inventors measured particles contained in the fluid circulated through the flow channel formed of a conductive fluororesin material containing carbon nanotubes with an additive amount of 0.025 weight %. FIG. 6 is a measurement result showing a relationship between a time for flowing water during which pure water was circulated and the number of particles measured by a particle counter (not shown).

The number of particles described herein refers to the number of particles which are contained in 1 ml of pure water and have a size of 0.04 μm or more.

In the measurement shown in FIG. 6, the flow ratio of pure water circulated through the flow channel was set to 0.5 liters/min. Further, an interruption state in which the circulation of pure water is interrupted and a circulation state in which the pure water is circulated were switched at intervals of five seconds. The temperature of the pure water was set to 25° C.

Although not shown in FIG. 6, the number of particles at the start of measurement (time for flowing water is zero) was about 340. After that, the number of particles gradually decreases over time, and after a lapse of a water flowing time of four hours, the number of particles is maintained at 10 or less.

Thus, in the earth ring 22 of this embodiment, since the ratio of carbon nanotubes contained in the conductive fluororesin material is a small ratio of 0.030 weight % or less, the contamination of the fluid due to contact with the fluid can be prevented, unlike other granular conductive materials such as carbon black and iron powder.

The operation and effects of the pressure detection device 100 of this embodiment described above will be described.

According to the pressure detection device 100 of this embodiment, the earth ring 22 is formed of a conductive fluororesin material and is maintained at the ground potential. Accordingly, the static electricity generated on the earth ring 22 due to a friction with the fluid, or the static electricity transmitted from the flow channel body 21 to the earth ring 22 is removed. Further, since the earth ring 22 which is maintained at the ground potential is disposed in contact with the pressure sensor 11, the static electricity generated on the pressure sensor 11 due to a friction with the fluid is also removed.

In this manner, according to the pressure detection device 100 of this embodiment, it is possible to prevent the occurrence of a defect that the static electricity is accumulated on the pressure sensor 11 for detecting the pressure of the fluid and on the flow channel unit 20 having the flow channel formed therein.

Further, the pressure detection device 100 of this embodiment includes the annular O-ring 17 which is formed of an elastic material, and the earth ring 22 includes the recessed groove portion 22*a* which is formed into an annular shape about the axis line X in the region opposed to the pressure detection surface. Further, the O-ring 17 is accommodated in the recessed groove portion 22*a* in a state where the O-ring 17 is in contact with the pressure sensor 11.

With this structure, a portion where a portion of the earth ring 22 that is located at the inner peripheral side of the recessed groove portion 22*a* is in contact with the pressure sensor 11 serve as the first seal region having an endless shape, and a portion where the O-ring 17 which is accommodated in the recessed groove portion 22*a* is in contact with the pressure sensor 11 serves as the second seal region having an endless shape. These two seal regions can reliably prevent leakage of the fluid.

Further, in the pressure detection device 100 of this embodiment, the earth ring 22 is formed into an annular shape about the axis line X and the flow channel body 21 includes the bottom surface 21*c* which accommodates the earth ring 22. The pressure detection device 100 also includes the outer holder 12 which fixes the position of the earth ring 22 in the axis line X direction by pressing the earth ring 22 against the bottom surface 21*c*, and the outer holder 12 is formed of a metallic material and is maintained at the ground potential.

With this structure, the position of the earth ring 22 in the axis line X direction can be reliably fixed by the outer holder 12 and the earth ring 22 can be maintained at the ground potential via the outer holder 12.

The pressure detection device 100 of this embodiment also includes the sensor holder 13 which fixes the position of the pressure sensor 11 in the axis line X direction by pressing the pressure sensor 11 against the earth ring 22.

With this structure, the position of the pressure sensor 11 in the axis line X direction can be more reliably fixed by the sensor holder 13.

Further, in the pressure detection device 100 of this embodiment, the flow channel body 21 includes the recess 21*b* having the inner peripheral surface formed into a tubular shape about the axis line X. The outer holder 12 is formed into a tubular shape about the axis line X, and the sensor holder 13 is formed into a tubular shape about the axis line X. Furthermore, in the pressure detection device 100 of this embodiment, the female screw 21*d*, which is formed in the inner peripheral surface of the recess 21*b*, is engaged with the male screw 12*a* which is formed on the outer peripheral surface of the outer holder 12, and the female screw 12*b*, which is formed in the inner peripheral surface of the outer holder 12, is engaged with the male screw 13*a* which is formed on the outer peripheral surface of the sensor holder 13.

With this structure, the positions of the earth ring 22 and the pressure sensor 11 in the axis line X direction can be fixed by such a simple operation that the outer peripheral surface of the outer holder 12 is engaged with the inner peripheral surface of the recess 21*b* of the flow channel body 21 and then the outer peripheral surface of the sensor holder 13 is engaged with the inner peripheral surface of the outer holder 12.

Further, in the pressure detection device 100 of this embodiment, the pressure detection surface includes the thin film-like diaphragm 11*a* having the first surface in contact with the protective film 11*c*, and the strain gauge 11*b* which is attached to the second surface of the diaphragm 11*a* that is not in contact with the protective film 11*c*. The diaphragm 11*a* is formed of a non-conductive material.

With this structure, the pressure sensor 11 can appropriately isolate the strain gauge 11b from the outside and highly accurately detect the pressure. When the diaphragm 11a in contact with the protective film 11c is formed of a non-conductive material, the static electricity is not transmitted to the diaphragm from the protective film 11c. However, since the protective film 11c is in contact with the earth ring 22, the static electricity can be introduced to the earth ring 22.

In the pressure detection device 100 of this embodiment, the conductive material is carbon nanotubes and the conductive fluororesin material contains the carbon nanotubes at a ratio of 0.020 weight % to 0.030 weight %.

Even with such a small ratio of carbon nanotubes, 0.020 weight % or more of the carbon nanotubes are dispersed in the fluororesin material to apply a constant conductivity to the earth ring 22, thereby making it possible to prevent charging of static electricity. This is because when tube-like carbon nanotubes having a predetermined length are used as a conductive material, only a small number of carbon nanotubes are needed to apply a conductivity, unlike other granular conductive material such as carbon black and iron powder.

Further, since the ratio of the carbon nanotubes contained in the conductive fluororesin material is a small ratio of 0.030 weight % or less, the contamination of the fluid due to the contact between the earth ring 22 and the fluid can be prevented, unlike other granular conductive materials such as carbon black and iron powder.

Other Embodiments

In the above description, the pressure detection device 100 is a straight-type pressure detection device including the flow channel 21a which is connected to the flow channel branched from the pipe through which the fluid is circulated. However, other forms may be employed.

Figure 7:
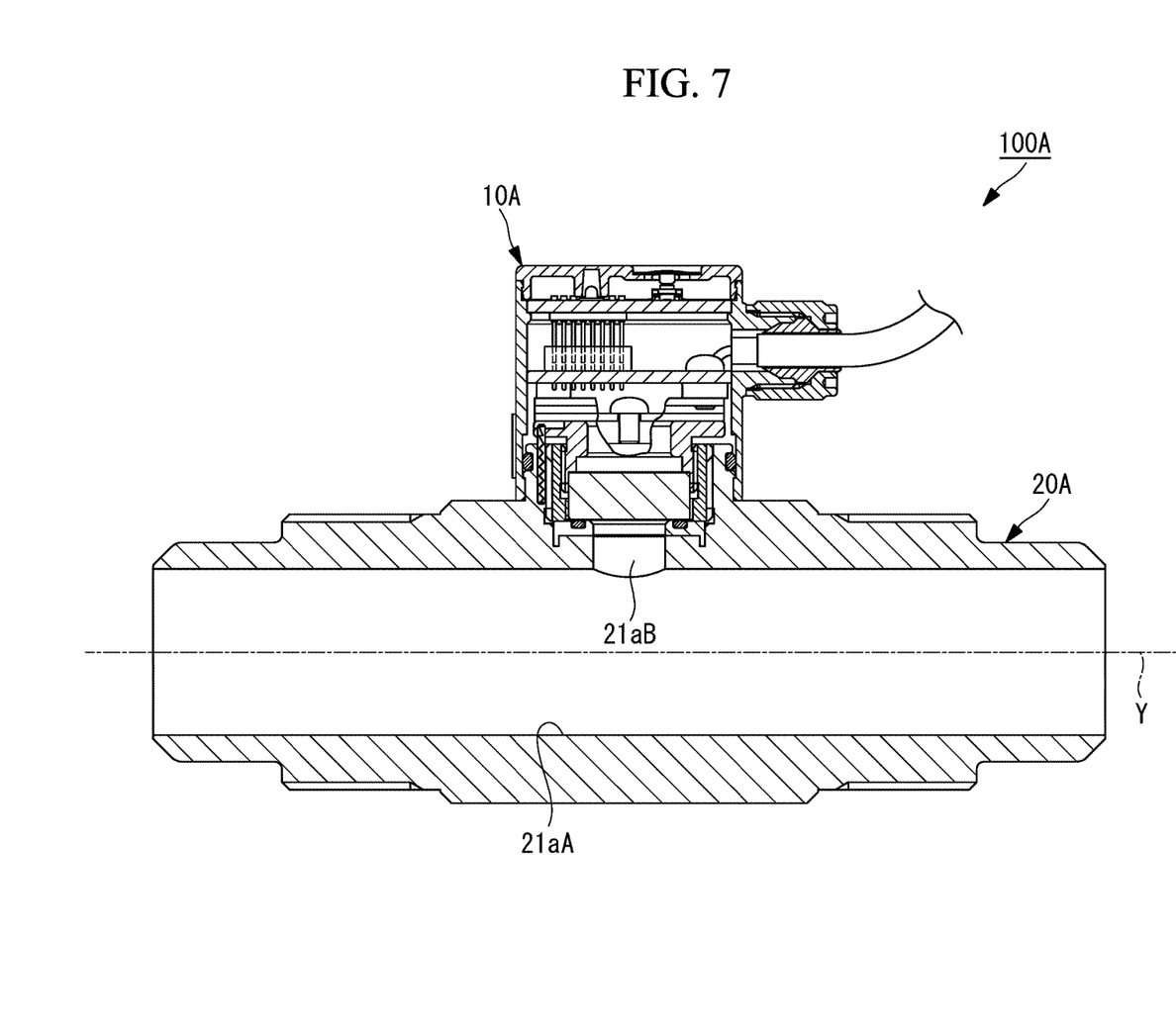
FIG. 7 is a longitudinal sectional view showing a pressure detection device according to another embodiment.

For example, as shown in FIG. 7, it is possible to employ an inline-type pressure detection device 100A which is provided with a flow channel unit 20A including an introduction flow channel 21aB that is opened to a linear flow channel 21aA extending along an axis line Y, and a pressure detection unit 10A which is disposed at a position in contact with the fluid circulated through the introduction flow channel 21aB.

Further, in the above description, the protective film 11c which is disposed in contact with the diaphragm 11a of the pressure sensor 11 is formed of a fluororesin material such as PTFE (polytetrafluoroethylene), but instead may be formed of other materials.

For example, the protective film 11c may be formed of the same conductive fluororesin material as that of the earth ring 22. When the protective film 11c is formed of a conductive fluororesin material, even if static electricity is generated due to a friction between the protective film 11c and the fluid, the static electricity is transmitted from the protective film 11c to the earth ring 22 and is removed.

Further, in the above description, the earth ring 22 is provided with the recessed groove portion 22a in which the O-ring 17 is disposed and the second seal region where the O-ring 17 is in contact with the protective film 11c of the pressure sensor 11 is formed. However, other forms may be employed.

For example, the pressure detection device may not be provided with the O-ring 17, and the earth ring 22 may have a planar shape, instead of forming the recessed groove portion 22a in the earth ring 22. In this case, only the first seal region where the earth ring 22 is in contact with the protective film 11c of the pressure sensor 11 is a seal region that inhibits inflow of the fluid from the flow channel 21a to the pressure detection unit 10.

The invention claimed is:

1. A pressure detection device comprising:
   a pressure detection portion including a pressure detection surface for detecting a pressure of a fluid; and
   a flow channel portion having a flow channel formed therein, the flow channel being configured to guide the fluid to the pressure detection surface,
   wherein the flow channel portion includes a flow channel body having the flow channel formed therein, and a contact portion disposed in contact with the pressure detection portion, and
   wherein the contact portion is formed of a conductive fluororesin material including a fluororesin material and a conductive material in which the fluororesin material is dispersed, and is maintained at a ground potential.

2. The pressure detection device according to claim 1, further comprising:
   an annular seal member formed of an elastic material,
   wherein the flow channel is a flow channel extending along an axis line,
   wherein the contact portion includes a recessed groove portion formed into an annular shape about the axis line in a region opposed to the pressure detection surface, and
   wherein the annular seal member is accommodated in the recessed groove portion in a state where the annular seal member is in contact with the pressure detection portion.

3. The pressure detection device according to claim 1, wherein the flow channel is a flow channel extending along an axis line,
   wherein the contact portion is formed into an annular shape about the axis line,
   wherein the flow channel body includes an accommodating portion configured to accommodate the contact portion,
   wherein the pressure detection device further comprises a first fixing portion configured to fix a position of the contact portion in the axis line direction by pressing the contact portion against the accommodating portion, and
   wherein the first fixing portion is formed of a metallic material and is maintained at the ground potential.

4. The pressure detection device according to claim 3, further comprising a second fixing portion configured to fix a portion of the pressure detection portion in the axis line direction by pressing the pressure detection portion against the contact portion.

5. The pressure detection device according to claim 4, wherein the flow channel body includes a recess having an inner peripheral surface formed into a tubular shape about the axis line,
   wherein the first fixing portion is formed into the tubular shape about the axis line,
   wherein the second fixing portion is formed into the tubular shape about the axis line,
   wherein a female screw formed in the inner peripheral surface of the recess is engaged with a male screw formed on an outer peripheral surface of the first fixing portion, and
   wherein a second female screw formed in an inner peripheral surface of the first fixing portion is engaged with a second male screw formed on an outer peripheral surface of the second fixing portion.

6. The pressure detection device according to claim 1, wherein the pressure detection portion includes a thin film like film protective portion disposed in contact with the pressure detection surface, the thin film like film protective portion being configured to break contact between the pressure detection surface and the fluid, and wherein the thin film protective portion is formed of the conductive fluororesin material.

7. The pressure detection device according to claim 6, wherein the pressure detection surface includes:

a thin film diaphragm having a first surface in contact with the thin film protective portion; and a resistor attached to a second surface of the thin film diaphragm, the second surface being not in contact with the thin film protective portion, and wherein the thin film diaphragm is formed of a non-conductive material.

8. The pressure detection device according to claim 1, wherein the conductive material is carbon nanotubes, and wherein the conductive fluororesin material contains the carbon nanotubes at a ratio of 0.020 weight % to 0.030 weight %.

* * * * *